(12) United States Patent
Lozman et al.

(10) Patent No.: US 8,258,231 B2
(45) Date of Patent: Sep. 4, 2012

(54) PROCESS FOR PREPARING A DISPERSION OF A PARTICULATE SOLID

(75) Inventors: Owen Roger Lozman, Manchester (GB); Richard Thomas Williams, Manchester (GB)

(73) Assignee: Fujifilm Imaging Colorants Limited, Manchester (GB)

( * ) Notice: Subject to any disclaimer, the term of this patent is extended or adjusted under 35 U.S.C. 154(b) by 0 days.

(21) Appl. No.: 13/003,984

(22) PCT Filed: Jun. 25, 2009

(86) PCT No.: PCT/GB2009/050728
§ 371 (c)(1),
(2), (4) Date: Jan. 13, 2011

(87) PCT Pub. No.: WO2010/010370
PCT Pub. Date: Jan. 28, 2010

(65) Prior Publication Data
US 2011/0123716 A1    May 26, 2011

(30) Foreign Application Priority Data
Jul. 23, 2008  (GB) .................................. 0813433.0

(51) Int. Cl.
*C08L 31/00*   (2006.01)
(52) U.S. Cl. ........ 524/556; 427/288; 524/543; 524/577; 524/555; 524/560
(58) Field of Classification Search .................. 524/556
See application file for complete search history.

(56) References Cited

U.S. PATENT DOCUMENTS

| | | | |
|---|---|---|---|
| 5,556,918 A | 9/1996 | Brodt et al. ................ 525/131 |
| 5,786,436 A * | 7/1998 | Fischer et al. ............. 526/307.6 |
| 6,262,152 B1 | 7/2001 | Fryd et al. ................. 524/90 |
| 6,262,207 B1 | 7/2001 | Rao et al. .................. 526/224 |
| 7,074,842 B2 * | 7/2006 | Chung et al. .............. 523/160 |
| 2002/0193514 A1 * | 12/2002 | Wang et al. ............... 524/853 |
| 2003/0078320 A1 * | 4/2003 | Yatake ...................... 523/160 |
| 2005/0075416 A1 * | 4/2005 | Miyabayashi ............. 523/160 |
| 2005/0075421 A1 | 4/2005 | Yatake ...................... 523/179 |
| 2006/0100307 A1 | 5/2006 | Uerz et al. ................. 523/160 |
| 2007/0259986 A1 | 11/2007 | Elwakil et al. ............ 522/83 |
| 2007/0276089 A1 * | 11/2007 | O'Donnell et al. ........ 525/61 |
| 2007/0287770 A1 | 12/2007 | Nishiguchi et al. ....... 523/160 |
| 2008/0090931 A1 | 4/2008 | Nagvekar et al. ......... 522/114 |
| 2009/0076211 A1 | 3/2009 | Yang et al. ................ 524/459 |

FOREIGN PATENT DOCUMENTS

| | | |
|---|---|---|
| DE | 43 28 215 | 3/1994 |
| EP | 1 245 644 | 10/2002 |
| EP | 1 388 545 | 2/2004 |
| EP | 1 878 774 | 1/2008 |
| EP | 2 351 800 | 8/2011 |
| WO | WO 98/44058 | 10/1998 |
| WO | WO 99/46310 | 9/1999 |
| WO | WO 2006/064193 | 6/2006 |
| WO | WO 2008/071661 | 6/2008 |
| WO | WO 2010/061798 | 6/2010 |

OTHER PUBLICATIONS

'International Search Report and Written Opinion issued Oct. 12, 2009, in PCT Application No. PCT/GB2009/050728.
Hayashi et al., Macromolecules, 37(14):5389-5396 (2004).
Bannister et al , Macromolecues, 39(22):7483-7492 (2006).
Mounteney et al., Polvmeiic Materials Science and Engineering 96:648-649 (2007).

* cited by examiner

*Primary Examiner* — Doris Lee
(74) *Attorney, Agent, or Firm* — Morgan, Lewis & Bockius LLP

(57) ABSTRACT

A process for preparing a dispersion of a particulate solid comprising:
dispersing a particulate solid with a dispersant and a liquid medium,
wherein the dispersant is a random copolymer obtained or obtainable from the copolymerisation of a composition comprising:
  i) one or more monoethylenically unsaturated hydrophilic monomers,
  ii) one or more monoethylenically unsaturated hydrophobic monomers,
  iii) one or more di- and/or higher-ethylenically unsaturated monomers, and
  iv) one or more chain transfer agents;
wherein the dispersion step is effected by a mechanical treatment which reduces the particle size of the particulate solid.

12 Claims, No Drawings

PROCESS FOR PREPARING A DISPERSION OF A PARTICULATE SOLID

This invention relates to a process for preparing a dispersion of a particulate solid and to a dispersion so prepared. It also relates to inks containing said dispersions.

WO 2006/064193 describes a process for providing dispersed pigments suitable for use in ink jet printing inks. The pigments are coated with a random copolymer dispersant derived from monoethylenically unsaturated monomers. These dispersants have a linear structure. The dispersant is then cross-linked around the pigment. While this process provides pigment dispersions with useful properties, there is a continuous need to improve the technology. In particular, there is a desire to provide prints with improved durability, particularly on glossy media. Furthermore the prints desirably have good optical density especially when printed onto plain paper. It is also desirable to find dispersants which facilitate easy milling of pigments to prepare dispersions of particles having a submicron average particle size. Such dispersions are also desirably stable with respect to storage or use. The present invention attempts to solve, at least in part, one or more of the abovementioned problems.

According to a first aspect of the present invention there is provided a process for preparing a dispersion of a particulate solid comprising:
dispersing a particulate solid with a dispersant and a liquid medium,
wherein the dispersant is a random copolymer obtained or obtainable from the copolymerisation of a composition comprising:
  i) one or more monoethylenically unsaturated hydrophilic monomers,
  ii) one or more monoethylenically unsaturated hydrophobic monomers,
  iii) one or more di- and/or higher-ethylenically unsaturated monomers, and
  iv) one or more chain transfer agents;
wherein the dispersion step is effected by a mechanical treatment which reduces the particle size of the particulate solid.

Preferably the process further comprises the step of cross-linking the dispersant with a cross-linking agent in the presence of the particulate solid and the liquid medium, thereby encapsulating the particulate solid within the cross-linked dispersant.

The particulate solid is preferably an inorganic or organic particulate solid or a mixture thereof which is insoluble in the liquid medium.

Examples of suitable particulate solids include inorganic and organic pigments; extenders and fillers for paints and plastics materials; disperse dyes and water-soluble dyes in liquid media which do not dissolve said dyes; optical brightening agents; textile auxiliaries for solvent dyebaths, inks and other solvent application system; particulate ceramic materials; magnetic particles (e.g. for use in magnetic recording media); biocides; agrochemicals; and pharmaceuticals. Preferably the particulate solid is a colorant, more preferably a pigment.

Preferably the pigment is a carbon black or an organic pigment.

A preferred particulate pigment is an organic pigment, for example any of the classes of pigments described in the Third Edition of the Colour Index (1971) and subsequent revisions of, and supplements thereto, under the chapter headed "Pigments". Examples of organic pigments are those from the azo (including disazo and condensed azo), thioindigo, indanthrone, isoindanthrone, anthanthrone, anthraquinone, isodibenzanthrone, triphendioxazine, quinacridone and phthalocyanine series, especially copper phthalocyanine and its nuclear halogenated derivatives, and also lakes of acid, basic and mordant dyes.

Carbon black, although normally regarded as being inorganic, behaves more like an organic pigment in its dispersing properties and is another example of a suitable particulate solid.

Preferred organic pigments are phthalocyanines, especially copper phthalocyanine pigments, azo pigments, indanthrones, anthanthrones and quinacridones.

Preferred inorganic particulate solids include: extenders and fillers, e.g. talc, kaolin, silica, barytes and chalk; particulate ceramic materials, e.g. alumina, silica, zirconia, titania, silicon nitride, boron nitride, silicon carbide, boron carbide, mixed silicon-aluminium nitrides and metal titanates; particulate magnetic materials e.g. magnetic oxides of transition metals, especially iron and chromium, e.g. gamma-$Fe_2O_3$, $Fe_3O_4$, and cobalt-doped iron oxides, calcium oxide, ferrites, especially barium ferrites; and metal particles, especially metallic iron, nickel, cobalt and alloys thereof; and carbon blacks. A particularly preferred inorganic particulate solid is carbon black. Gas blacks are especially preferred.

Where the process of the present invention is used to make particulate solid dispersions for use in inks, for example ink jet printing inks, the pigment is preferably a cyan, magenta, yellow or black pigment. The particulate solid may be a single chemical species or a mixture comprising two or more chemical species (e.g. a mixture comprising two or more different pigments which may be the same or different colours). In other words, two or more different particulate solids may be used in the process of the present invention.

The pigment is preferably not surface treated so as to have dispersing groups covalently bonding to its surface. Preferably, the pigment is not dispersible in the liquid medium (especially water) without the aid of a dispersant.

Preferably, prior to any mechanical treatment the particulate solid has a volume averaged particle size of 1 micron or more, for example from 1 to 100 microns.

The liquid medium may be non-polar but is preferably polar. "Polar" liquid media are generally capable of forming moderate to strong bonds, e.g. as described in the article entitled "A Three Dimensional Approach to Solubility" by Crowley et al in Journal of Paint Technology, Vol. 38, 1966, at page 269. Polar liquid media generally have a hydrogen bonding number of 5 or more as defined in the abovementioned article.

Examples of suitable polar liquid media include ethers, glycols, alcohols, polyols, amides and especially water.

Preferably, the liquid medium is or comprises water as this tends to result in a particularly stable and fine dispersion. Accordingly, preferred liquid media are aqueous. Preferably, the liquid medium comprises from 1 to 100%, more preferably from 10 to 100%, especially from 20 to 90% and more especially from 30 to 80% water by weight. The remainder is preferably one or more polar organic liquids. Particularly preferred polar organic liquids are isopropanol, dipropylene glycol and mixtures thereof.

Preferred non-polar liquid media include non-halogenated aromatic hydrocarbons (e.g. toluene and xylene); halogenated aromatic hydrocarbons (e.g. chlorobenzene, dichlorobenzene and chlorotoluene); non-halogenated aliphatic hydrocarbons (e.g. linear and branched aliphatic hydrocarbons containing six or more carbon atoms, including fully and partially saturated), halogenated aliphatic hydrocarbons (e.g. dichloromethane, carbon tetrachloride, chloroform, trichloroethane); natural non-polar liquids (e.g. vegetable oil, sunflower oil, linseed oil, terpenes and fatty glycerides); and combinations thereof.

The liquid medium may comprise a mixture of liquids which may be polar or non-polar liquids. It is preferred that at least one component of the liquid medium is a polar liquid and more preferred that all of the components of the liquid medium are polar liquids.

When the liquid medium comprises more than one liquid said liquid medium may be in the form of a multi phase liquid (e.g. a liquid-liquid emulsion) but is preferably in the form of a single phase (homogeneous) liquid.

Preferably, the polar liquids other than water are water-miscible.

In a preferred embodiment the liquid medium comprises water and a water-miscible organic liquid. Such a liquid medium is preferred because it enhances the effectiveness of the mechanical treatment step and speeds the reduction in the average particle size of the particulate solid.

Preferred water-miscible organic liquids for inclusion into the liquid medium include $C_{1-6}$-alkanols, preferably methanol, ethanol, n-propanol, isopropanol, n-butanol, sec-butanol, tert-butanol, n-pentanol, cyclopentanol and cyclohexanol; linear amides, preferably dimethylformamide or dimethylacetamide; water-miscible ethers, preferably tetrahydrofuran and dioxane; diols, preferably diols having from 2 to 12 carbon atoms, for example ethylene glycol, propylene glycol, butylene glycol, pentylene glycol, hexylene glycol and thiodiglycol and oligo- and poly-alkyleneglycols, preferably diethylene glycol, triethylene glycol, polyethylene glycol and polypropylene glycol; trials, preferably glycerol and 1,2,6-hexanetriol; mono-$C_{1-4}$-alkyl ethers of diols, preferably mono-$C_{1-4}$-alkyl ethers of diols having 2 to 12 carbon atoms, especially 2-methoxyethanol, 2-(2-methoxyethoxy)ethanol, 2-(2-ethoxyethoxy)-ethanol, 2-[2-(2-methoxyethoxy)ethoxy]ethanol, 2-[2(2-ethoxyethoxy)-ethoxy]-ethanol and ethyleneglycol monoallylether; cyclic amides, preferably 2-pyrrolidone, N-methyl-2-pyrrolidone, N-ethyl-2-pyrrolidone, caprolactam and 1,3-dimethylimidazolidone. As previously mentioned isopropanol and dipropylene glycol are particularly preferred. Of these dipropylene glycol proves to be especially effective in assisting the mechanical treatment step.

Preferably, the liquid medium comprises water and 1 or more, especially from 1 to 3, water-miscible organic liquids.

The weight ratio of water to water-miscible organic liquid when both are present in the liquid medium is preferably from 99:1 to 5:95, more preferably 95:5 to 50:50, especially 95:5 to 75:25.

The process may optionally further comprise the step of mixing the dispersant with a nonsolvent to form a precipitate of the dispersant, separating the precipitated dispersant from the nonsolvent and adding the separated dispersant to fresh solvent. This further step is preferably performed prior to the dispersant coming into contact with the particulate solid. Typically the nonsolvent is a non-polar liquid (e.g. hexane) and the solvent is a polar liquid (e.g. water or a mixture of water and one or more water-miscible organic liquids).

When the dispersant comprises ionic groups these are preferably in the form of the salt. For acidic groups preferred salts include alkali metal, ammonium, and organic amine salts. For cationic groups the preferred salts include halide, nitrate and sulphate. Preferably, the dispersant has no cationic groups.

When the dispersant comprises acidic groups (e.g. carboxy and/or sulpho groups) the process preferably further comprises the step of neutralising such acidic groups, for example using an alkali metal salt (especially sodium hydroxide or potassium hydroxide).

Preferably the dispersant has a calculated Log P of no more than 4.0, more preferably from 1.0 to 4.0. The calculated Log P may be determined by the method described in WO 2005/061087, page 9, line 35 to page 10, line 21, which is incorporated herein by reference thereto.

Preferably, the dispersant has one or more acid groups. The acid groups are preferably sulfonic acid, phosphoric acid, phosphonic acid and especially carboxylic acid. Preferably, the only acid group(s) present in the dispersant are carboxylic acid group(s).

The dispersant preferably has an average of two or more and especially ten or more carboxylic acid groups per molecule.

When the dispersant is to be cross-linked with a cross-linking agent the dispersant preferably has ten or more carboxylic acid groups per molecule.

The carboxylic acid group(s) may be present in the dispersant in the form of a free acid (—COOH) or more preferably in the form of a salt. The salt may be, for example, an alkali metal ion, an ammonium, substituted ammonium, quaternary ammonium or pyridinium salt.

Carboxylic acid group(s) may be incorporated into the dispersant by, for example, copolymerising one or more monoethylenically unsaturated hydrophilic monomers containing at least one carboxylic acid group. Examples of such monomers include itaconic acid, maleic acid, fumaric acid, crotonic acid, more preferably methacrylic acid, acrylic acid and beta carboxy ethyl acrylate.

The carboxylic acid group(s), when present in the dispersant, can be used to cross-link with groups reactive towards carboxylic acid groups (e.g. epoxy, isocyanate, oxazoline, aziridine, carbodiimide, N-methylol groups) in a cross-linking agent. In addition, any unreacted carboxylic acid groups may assist in the stabilisation of the final encapsulated particulate solid against flocculation and aggregation. Carboxylic acid groups are effective as stabilising groups in polar and more especially aqueous media.

When carboxylic acid group(s) are the only groups for stabilising the final encapsulated particulate solid dispersed in the liquid medium and the cross-linking agent has epoxy groups it is preferable to have a molar excess of carboxylic acid groups to epoxy groups to ensure that unreacted carboxylic acid groups remain after the cross-linking reaction has been completed. In one embodiment the ratio of moles of carboxylic acid groups to moles of epoxy groups is preferably from 10:1 to 1.1:1, more preferably from 5:1 to 1.1:1 and especially preferably from 3:1 to 1.1:1

The dispersant may optionally have other stabilising groups. The choice of the stabilising groups as well as the amounts of such groups will depend to a large extent on the nature of the liquid medium. Stabilising groups tend to be either hydrophilic in nature (e.g. for polar liquid media) or hydrophobic in nature (e.g. for non-polar liquid media).

Preferably however, the dispersant has no hydrophilic non-ionic groups. Hydrophilic non-ionic groups which are preferably absent include polyalkyleneoxy (especially polyethyleneoxy) and hydroxy groups.

The monoethylenically unsaturated hydrophilic monomers may be all of the same chemical formula or they may comprise two or more (e.g. two to ten) different monoethylenically unsaturated hydrophilic monomers.

The monoethylenically unsaturated hydrophilic monomers may have ionic and/or non-ionic hydrophilic groups. The ionic groups may be cationic but are preferably anionic.

Both cationic and anionic groups may be present to give amphoteric stabilisation. Preferred anionic groups are phenolic, sulphonic acid, sulphato, phosphonic, polyphosphoric, phosphoric acid and especially carboxylic acid groups which may be in the free acid or salt form as hereinbefore described. Preferred cationic groups are quaternary ammonium, benzalkonium, guanidine, biguanidine and pyridinium. These can be in the form of a salt such as a hydroxide, sulphate, nitrate, chloride, bromide, iodide and fluoride. Suitable hydrophilic non-ionic groups are glucoside, saccharide, pyrrolidone, acrylamide, hydroxy groups, poly(alkyleneoxide) groups, poly(ethyleneoxide) or poly(propyleneoxide) groups, for example groups of the formula —$(CH_2CH_2O)_nH$ or —$(CH_2CH_2O)_nC_{1-4}$-alkyl wherein n is from 3 to 200 (preferably 4 to 20). Preferably, however, these hydrophilic non-ionic groups are not present in the dispersant.

The dispersant may contain, for example, a single hydrophilic non-ionic group, several hydrophilic non-ionic groups throughout the dispersant or one or more polymeric chains containing hydrophilic non-ionic groups. Hydroxy groups can be incorporated using polymeric chains such as polyvinylalcohol, polyhydroxyl functional acrylics and celluloses. Ethyleneoxy groups can be incorporated using polymeric chain's such as polyethyleneoxide.

Suitable hydrophilic monoethylenically unsaturated monomers include hydrophilic non-ionic and ionic (meth) acrylate monomers.

Suitable hydrophilic non-ionic monoethylenically unsaturated monomers are those containing saccharide, glucoside, amide, pyrrolidone and especially hydroxy and ethoxy groups.

Suitable examples of hydrophilic non-ionic monoethylenically unsaturated monomers include hydroxyethyl acrylate, hydroxyethyl methacrylate, vinyl pyrrolidone, ethoxylated (meth)acrylates and (meth)acrylamides.

Hydrophilic ionic monoethylenically unsaturated monomers may be cationic but are preferably anionic.

Preferred hydrophilic anionic monoethylenically unsaturated monomers are those comprising carboxylic, phosphoric acid groups and/or sulphonic acid groups which may be in the free acid form or salts thereof. The types of salts are as described hereinbefore. Preferred examples are acrylic acid, methacrylic acid, betacarboxy ethyl acrylate, styrenesulphonic acid, vinyl benzylsulphonic acid, vinylsulphonic acid, acryloyloxyalkyl sulphonic acids (for example, acryloyloxymethyl sulphonic acid, acryloyloxyethyl sulphonic acid, acryloyloxypropyl sulphonic acid and acryloyloxybutyl sulphonic acid), methacryloyloxymethyl sulphonic acid, methacryloyloxyethyl sulphonic acid, methacryloyloxypropyl sulphonic acid and methacryloyloxybutyl sulphonic acid), 2-acrylamido-2-alkylalkane sulphonic acids (for example, 2-acrylamido-2-methylethanesulphonic acid, 2-acrylamido-2-methylpropanesulphonic acid and 2-acrylamido-2-methylbutane sulphonic acid), 2-methacrylamido-2-alkylalkane sulphonic acids (for example, 2-methacrylamido-2-methylethanesulphonic acid, 2-methacrylamido-2-methylpropanesulphonic acid and 2-methacrylamido-2-methylbutanesulphonic acid), mono-(acryloyloxyalkyl)phosphates (for example, mono(acryloyloxyethyl)phosphate and mono(3-acryloyloxypropyl)phosphates) and mono (methacryloyloxyalkyl)phosphates (for example, mono (methacryloyloxyethyl)phosphate and mono(3-methacryloyloxypropyl) phosphate).

Of these methacrylic acid is especially preferred. Preferably, the monoethylenically unsaturated hydrophilic monomer(s) comprises and more preferably is methacrylic acid.

It is particularly preferred that the dispersant has no hydrophilic non-ionic groups and the only hydrophilic ionic group is carboxylic acid or a salt thereof.

Suitable hydrophilic cationic monoethylenically unsaturated monomers are those comprising tertiary amine, quaternary amine, pyridine, guanidine and biguanidine groups.

The monoethylenically unsaturated hydrophobic monomers may be all of the same chemical formula or they may comprise two or more (e.g. two to ten) different monoethylenically unsaturated hydrophobic monomers.

Monoethylenically unsaturated hydrophobic monomers are typically free from ionic and non-ionic hydrophilic groups. Preferred examples include esters of (meth)acrylic acid. Preferably, the one or more monoethylenically unsaturated hydrophobic monomers comprises an ester of (meth)acrylic acid. More preferably, all of the one or more monoethylenically unsaturated hydrophobic monomers are esters of (meth)acrylic acid.

Preferred monoethylenically unsaturated hydrophobic monomers include $C_{1-20}$-hydrocarbyl (meth)acrylates, styrene and vinyl naphthalene. Especially preferred are $C_{1-10}$-hydrocarbyl (meth)acrylates for example methyl (meth)acrylate, ethyl (meth)acrylate, butyl (meth)acrylate, 2-ethyl hexyl (meth)acrylate and benzyl (meth)acrylate.

Diethylenically unsaturated monomers have two ethylenically unsaturated groups.

The diethylenically unsaturated monomers and higher ethylenically unsaturated monomers may be all of the same chemical formula or they may comprise two or more (e.g. two to ten) different diethylenically unsaturated monomers and higher ethylenically unsaturated monomers.

As used herein the word "higher" when applied to ethylenically unsaturated groups means three or more ethylenically unsaturated groups.

Preferred diethylenically unsaturated monomers and higher ethylenically unsaturated monomers have on average from two to five ethylenically unsaturated groups per molecule.

Preferably the copolymerisation composition contains no higher ethylenically unsaturated monomers.

The di- and or higher-ethylenically unsaturated monomers may be oligomeric in nature.

Preferably the random copolymer contains no repeat units from the copolymerisation of higher ethylenically unsaturated monomers.

Examples of diethylenically unsaturated monomers include, but are not limited to divinylbenzene, bis-(4-ethenylphenyl)methane, divinyldioxane, divinyl ether, 1,4-butanediol divinyl ether, hexanediol divinyl ether, cyclohexanediol divinyl ether, ethylene glycol divinyl ether, diethylene glycol divinyl ether, cyclohexanedimethanol divinyl ether, 1,3-divinyl-1,1,3,3-tetramethyldisilazane, divinyl 1,3-diphenyl-1,3-dimethyldisilazane, divinyl tetraethoxy-1,3-disilazane, divinyl tetramethoxy-1,3-disilazane, divinyl 1,3-diphenyl-1,3-dimethyl-1,3-disiloxane, divinylacetylene, N,N-divinylaniline, divinylcarbinol, divinylcarbonate, 1,2-divinylcyclobutane, cis-1,2-divinylcyclohexane, trans-1,2-divinylcyclohexane, 1,4-divinylcyclohexanedimethanol diether, divinyldibutyltin, 2,5-divinyldioxane, 1,1'-divinylferrocene, divinylformal, divinyl glycol, 1,4-divinylperfluorobutane, 1,6-divinylperfluorohexane, divinylphenylphosphine, 3,9-divinylspirobim-dioxane, divinylsulphone, 1,4-divinyl-1,1,4,4-tetramethyldisilylethylene, divinyl tin dichloride, divinyl triethylene glycol diether, 1,5-bis-divinyloxy-3-oxapentane, divinylsilane, divinyldiethoxysilane, divinyldimethylsilane, divinyldiphenylsilane, 1,1'-bis(2-vinyloxyethoxy)-4,4'-isopropylidene diphenol, ethylene glycol dimethacrylate, bisphenol A dimethacrylate, bisphenol A 2-hydroxyethyl dimethacrylate, 1,3-butylene glycol dimethacrylate, 1,4-butanediol dimethacrylate, butenediol dimethacrylate, 2-butyl-2-ethyl-1,3-propanediol dimethacrylate, 2-butyne-1,4-diyl dimethacrylate, 1,4-cyclohexanediol dimethacrylate, decamethylene glycol dimethacrylate, diethylene glycol dimethacrylate, 2,3-dihydroxypropyl dimethacrylate, 1,6-dimethylhexanediol dimethacrylate, 2,5-dimethylhexanediol dimethacrylate, dipropylene glycol dimethacrylate, diurethane dimethacrylate, 1,12-dodecanediol dimethacrylate, ethylidene dimethacrylate, glycerol dimethacrylate, 1,5-tetrahydroperfluoropentyl dimethacrylate, hexafluorobisphenol A dimethacrylate, hexylene glycol dimethacrylate, hydrogenated bisphenol A dimethacrylate, methylene glycol dimethacrylate, neopentyl glycol dimethacrylate, 2,2,3,3,4,4,5,5-octafluorohexanediol 1,6-dimethacrylate, pentaerythritol dimethacrylate, 1,5-pentanediol dimethacrylate, perfluorocyclohexyl 1,4-dimethyl dimethacrylate, o-phenylene dimethacrylate, p-phenylene dimethacrylate, styrene glycol dimethacrylate, polyethylene glycol 600 dimethacrylate, polyethylene glycol 400 dimethacrylate, 1,2-propylene glycol dimethacrylate, propylene glycol dimethacrylate, sorbitol dimethacrylate, 4,4'-sulphonyl diphenol dimethacrylate, tetrabromo bisphenol A dimethacrylate, tetrachloro bisphenol A dimethacrylate, tetraethylene glycol dimethacrylate, 2,2,3,3-tetrafluorobutanediol dimethacrylate, triethylene glycol dimethacrylate, trimethyl pentanediol dimethacrylate, urethane dimethacrylate, zinc dimethacrylate, zirconium(IV) dimethacrylate, butanediol diacrylate, N,N-diacryloyl acrylamide, bisphenol A diacrylate, bisphenol A 2-hydroxyethyl diacrylate, 1,3-butylene glycol diacrylate, 1,4-butanediol diacrylate, 1,10-decanediol diacrylate, propoxylated neopentyl glycol diacrylate, ethoxylated bisphenol A diacrylate and dimethacrylate, ethylene glycol dimethacrylate, tetraethylene glycol diacrylate, tri-propylene glycol dimethacrylate, diethyl 1,3-propanediol diacrylate, diethylene glycol diacrylate, dimethyl bisphenol A diacrylate, dipropylene glycol diacrylate, ethyl 1,3-hexanediol diacrylate, ethylene diacrylate, ethylidene diacrylate, hexafluorobisphenol A diacrylate, 1,6-hexanediol diacrylate, 2,5-hexanediol diacrylate, neopentyl glycol diacrylate, propoxylated neopentyl glycol diacrylate, 1,9-nonamethylene diacrylate, 2,2,3,3,4,4,5,5-octafluorohexanediol 1,6-diacrylate, 1,5-pentanediol diacrylate, p-phenylene diacrylate, polyethylene glycol 400 diacrylate, 1,2-propylene glycol diacrylate, propylene glycol diacrylate, sorbitol diacrylate, tetrabromobisphenol A diacrylate, polyethylene glycol 200 diacrylate, 2,2,3,3-tetrafluorobutanediol diacrylate, thiol diethylene glycol diacrylate, triethylene glycol diacrylate, tripropylene glycol diacrylate, urethane diacrylate, zinc diacrylate, diethylene glycol diacryloxypropionate, bis-acryloyl piperazine and diallyl maleate.

A preferred diethylenically unsaturated monomer is divinylbenzene and/or diurethane di(meth)acrylate.

Higher-ethylenically unsaturated monomers have three or more ethylenically unsaturated groups, e.g. 3 or 4 of such groups. Preferred higher ethylenically unsaturated monomers include triethylenically unsaturated monomers and tetraethylenically unsaturated monomers.

Examples of triethylenically unsaturated monomers include triacrylformal, pentaerythritol triallyl esters, glyceryl propoxy triacrylate, ferric triacrylate, pentaerythritol triacrylate, triazine-2,4,6-triyl-1,2-ethanediyl triacrylate, trimethylol ethane triacrylate, trimethylol propane triacrylate, ethoxylated trimethylol ethane triacrylate, ethoxylated trimethylol propane triacrylate, glycerol trimethacrylate, propoxylated glycerol triacrylate, pentaerythritol trimethacrylate, 1,2,5-pentanetriol trimethacrylate, triethanolamine trimethacrylate, trimethylol ethane trimethacrylate, trimethylol propane trimethacrylate, tris(2-hydroxyethyl) isocyanurate trimethacrylate.

Examples of tetraethylenically unsaturated monomers include pentaerythritol tetraacrylate, zirconium(IV) tetraacrylate, pentaerythritol tetramethacrylate, and zirconium (IV) tetramethacrylate.

The total amount of monoethylenically unsaturated monomers (hydrophilic and hydrophobic) in the monomer mixture is in the range from 50% to 99.7%, preferably 70% to 99%, especially 85% to 98.5%, by weight relative to the total weight of ethylenically unsaturated monomers used to prepare the dispersant.

The amount of di- and higher-ethylenically unsaturated monomers is preferably from 0.3% to 50%, preferably 1% to 30%, especially 1.5 to 15%, by weight relative to the total weight of ethylenically unsaturated monomers used to prepare the dispersant.

The dispersant is preferably chosen to suit the liquid medium to be used in the process for preparing the dispersion and also the liquid vehicle to be used in any final intended composition in which the particulate solid will be used (e.g. inks). Thus, for example, when the particulate solid is to be used in an aqueous ink jet printing ink the dispersant preferably has a significant proportion of hydrophilic groups. Similarly, when the particulate solid is to be used in an oil-based (non-aqueous) ink the dispersant preferably has a significant amount of hydrophobic groups.

Preferably the composition used to make the dispersant further comprises an initiator, especially a free radical initiator. Preferably, the initiator is thermally activated.

Examples of free radical initiators include azo compounds such as 2,2'-azobis(isobutyronitrile), 2,2'-azobis-(2-methyl) butanenitrile, 4,4'-azobis(4-cyanovaleric acid), 2-(t-butylazo)-2-cyanopropane, and 2,2'-azobis[2-methyl-N-hydroxyethyl)]-propionamide. Other soluble free radical initiators may also be used, examples of which include peroxy compounds such as benzoyl peroxide, lauroyl peroxide, hydrogen peroxide, and sodium, potassium and ammonium persulphates. Redox initiator systems can also be used, examples of which include redox pairs such as ammonium persulphate and sodium metabisulphite. Generally 0.1 to 15 grams of free radical initiator is used per 100 grams of ethylenically unsaturated compounds.

The initiator may be present in the composition in an amount from 0.1 to 15%, especially from 1 to 5% by weight based on the total amount of ethylenically unsaturated monomers present in the composition. When higher levels of chain transfer agent are used it is also sometimes advantageous to also increase the levels of initiator.

The acid value (AV) of the dispersant is preferably from 50 to 320 and more preferably from 50 to 200 mg KOH/g. Dispersants having such acid values provide a resultant dispersion which exhibits particularly high stability and good OD. High stability is especially useful in the demanding liquid vehicles used in ink jet printing and with more difficult to disperse particulate solids.

The molecular weight of the dispersant may be varied widely, with number average molecular weights preferably being 500 to 100,000, more preferably 1,000 to 50,000 and especially from 1,000 to 35,000. The molecular weight is preferably measured by triple detection gel permeation chromatography ("GPC"). The dispersant need not be totally soluble in the liquid medium. That is to say perfectly clear and non-scattering solutions are not essential. The dispersant may aggregate in surfactant-like micelles giving slightly hazy solutions in the liquid medium. The dispersant may be such that some proportion of the dispersant tends to form a colloid or micellar phase. It is preferred that the dispersant produces uniform and stable dispersions in the liquid medium which do not settle or separate on standing.

It is preferred that the dispersant is substantially soluble in the liquid medium (especially water), giving rise to clear or hazy solutions.

When the dispersant is cross-linked it is preferred that the dispersant is adsorbed onto the particulate solid prior to cross-linking so as to form a relatively stable dispersion. This dispersion is then cross-linked using the cross-linking agent, preferably in the presence of a borate compound. This pre-adsorption and pre-stabilisation differs from coacervation approaches. In coacervation approaches a polymer or pre-polymer (which is not a dispersant) is mixed with a particulate solid, a liquid medium and a cross-linking agent and only during or after cross-linking does the resultant cross-linked polymer precipitate onto the particulate solid.

The cross-linking agent may be of any suitable kind provided that it is able to cross-link the dispersant molecules. When the dispersant contains carboxylic acid groups the preferred cross-linking agents include isocyanate, oxazoline, aziridine, carbodiimide, melamine formaldehyde resin and especially epoxide cross-linking agents. Cross-linking agents may have two or more cross-linking groups. Preferred cross-linking agents have from 2 to 10, and especially from 2 to 6 cross-linking groups.

The cross-linking agent may or may not contain an oligomeric dispersing group.

When present the oligomeric dispersing group preferably is or comprises polyalkyleneoxide, more preferably a polyC$_{2-4}$-alkyleneoxide and especially a polyethyleneoxide. The polyalkyleneoxide groups provide steric stabilisation which improves the stability of the resulting encapsulated particulate solid.

Preferably the polyalkyeneoxide contains from 3 to 200, more preferably from 5 to 50 alkyleneoxide and especially from 5 to 20 alkyleneoxide repeat units.

Pairs of reactive and reactable groups which may be included in the cross-linking agent and dispersant respectively are as disclosed in International patent application WO 2005/061087, page 6, Table 1, which is incorporated herein by reference thereto. Preferably the dispersant has two or more carboxylic acid groups and the cross-linking agent has two or more epoxy groups.

Preferred cross-linking agents having two epoxy groups and zero oligomeric dispersing groups are ethylene glycol diglycidyl ether, resorcinol diglycidyl ether, neopentyl glycol diglycidyl ether, 1,6-hexanediol diglycidyl ether, hydrogenated bisphenol A diglycidyl ether and polybutadiene diglycidyl ether.

Preferred cross-linking agents having two epoxy groups and one or more oligomeric dispersing groups are diethylene glycol diglycidyl ether, poly ethylene glycol diglycidyl ether, dipropylene glycol diglycidyl ether and poly propylene glycol diglycidyl ether.

Preferred cross-linking agents having three or more epoxy groups and zero oligomeric dispersing groups are sorbitol polyglycidyl ether, polyglycerol polyglycidyl ether, pentaerythritol polyglycidyl ether, diglycerol polyglycidyl ether, glycerol poly glycidyl ether and trimethylolpropane polygycidyl ether.

A preferred example of a polymeric cross-linking agent is a polyvinyl copolymer comprising glycidyl (meth)acrylate.

Preferably the cross-linking agent is soluble in the liquid medium, especially when the liquid medium is aqueous.

More preferably the cross-linking agent has a water-solubility of at least 1% by weight at 25° C.

The cross-linking agent may have one or more ethylene glycol groups to help solubilise the cross-linking agent.

One, or more than one cross-linking agent can be used in the process. When more than one cross-linking agent is used these may have the same or different numbers of cross-linking groups.

It is preferred that the only cross-linking groups present on the cross-linking agent are epoxy groups.

The function of the chain transfer agent (CTA) is to avoid premature cross-linking and subsequent gelling of the dispersant which would otherwise result from the presence of the di- and/or higher-ethylenically unsaturated monomers. While not wishing to be bound or limited by any theory, it is believed that the presence of the di- and/or higher-ethylenically unsaturated monomers creates random branching points in the growing random copolymer and the chain transfer agents serve to limit the molecular weight of the individual polymer chains, while not particularly limiting the overall molecular weight of the dispersant, thereby avoiding gelling.

Thus, the dispersant is a branched dispersant, preferably a highly branched dispersant.

Preferred chain transfer agents include mercaptans, e.g. 3-mercaptopropionic acid, octyl mercaptan, n-dodecyl mercaptan, t-dodecyl mercaptan, n-hexadecyl mercaptan, n-tetradecyl mercaptan and t-tetradecyl mercaptan, butyl 3-mercaptopropionate; xanthogenndisulfides, e.g. dimethyl xanthogenndisulfide, diethyl xanthogenndisulfide and diisopropyl xanthogenndisulfide; thiuram disulfides, e.g. tetramethyl thiuram disulfide, tetraethyl thiuram disulfide and tetrabutyl thiuram disulfide; halogenated hydrocarbons, e.g. carbon tetrachloride and ethylene bromide; hydrocarbons e.g. pentaphenylethane; unsaturated cyclic hydrocarbon compounds such as acrolein, methacrolein, allyl alcohol, 2-ethylhexyl thioglycolate, terpinolene, alpha terpinene, gamma terpinene, diterpene, alpha methylstyrene dimer, 9,10-dihydroanthracene, 1,4-dihydronaphthalene, indene and 1,4-cyclohexadiene; unsaturated heterocyclic compounds such as xanthene and 2,5-dihydrofuran; cobalt chelate compounds; and the like. These chain transfer agents can be used alone or in admixture of at least two kinds.

Cobalt chelate compounds which may be used as chain transfer agents are preferably cobalt II or III compounds, more preferably cobalt II compounds described in U.S. Pat. No. 5,770,665, formula I, which is incorporated herein by reference thereto, including the definitions at column 1, line 52 to column 2, line 16.

The optimum amount of chain transfer agent to be used in a composition will depend on the amount of di- and/or higher-ethylenically unsaturated monomers present, the number of ethylenically unsaturated groups they have and their reactivities. One may determine the optimum amount of chain transfer agent to be used experimentally, e.g. by first polymerising the composition without any chain transfer agent present, then repeating the polymerisation using increasing amounts of chain transfer agent. The point at which no gellation occurs indicates the minimum amount of chain transfer agent to be used. Slightly more than this minimum amount will usually be used to ensure gel formation is avoided.

In our experiments we observed, as an approximation, that the number of moles of chain transfer agent to use ($M_{CTA}$) per mole of each di- or higher-ethylenically unsaturated monomers present in the composition is given by the equation:

$$M_{CTA} = y(n-1)$$

wherein:
n is the number of ethylenically unsaturated groups in the di- and higher-ethylenically unsaturated monomer; and
y is 0.9 to 6, more preferably 0.9 to 3, especially 0.9 to 2 and most especially about 1.

Thus, considering y is from 0.9 to 2 then for a diethylenically unsaturated monomer one could use 0.9 to 2 moles of chain transfer agent per mole of the diethylenically unsaturated monomer. For a triethylenically unsaturated monomer one could use 1.8 to 4 moles of chain transfer agent per mole of the triethylenically unsaturated monomer. For a tetraethylenically unsaturated monomer one could use 2.7 to 6 moles of chain transfer agent per mole of the tetraethylenically unsaturated monomer. For a mixture of di- and triethylenically unsaturated monomers one would calculate the amount of chain transfer agent required for each monomer as indicated above and include that amount in the composition. Put simply, one may use $0.9(n-1)$ to $3(n-1)$ moles of chain transfer agent per mole of di- or higher-ethylenically unsaturated monomer, where n is the number of ethylenically unsaturated groups in the di- or higher-ethylenically unsaturated monomer.

We have found that this equation tends not to apply quite as well where Cobalt chelate compounds used as the CTA. The equation is particularly effective for sulfur containing CTAs. The equation works especially well for sulfur containing CTAs when used in conjunction with compositions comprising (meth)acrylate monomers.

A preferred composition comprises:
a) 20 to 40 mol % of monoethylenically unsaturated hydrophilic monomers;
b) 50 to 70 mol % of monoethylenically unsaturated hydrophobic monomers,
c) 1 to 30 mol %, more preferably 2 to 20 mol % of di- and/or higher ethylenically unsaturated monomers;
wherein mol % is based on the total number of moles of all monomers a) to c) the total mol % of monomers a) to c) is 100%; and
d) $0.9(n-1)$ to $3(n-1)$ moles of chain transfer agent per mole of di- or higher-ethylenically unsaturated monomer(s), where n is the number of ethylenically unsaturated groups in the di- or higher-ethylenically unsaturated monomer(s); and
e) 0.5 to 3 wt % of free radical initiator(s) based on the sum of the weights of components a) to c).

The composition may of course contain further ingredients in addition to components a. to e. (e.g. diluents). Typically the abovementioned components are dissolved or dispersed in a liquid medium, e.g. in a weight ratio of components a. to e. to liquid medium of from 1:1.5 to 1:10, more preferably from 1:1.5 to 1:4.0.

The particulate solid, the liquid medium and the dispersant may be mixed in any order or simultaneously.

The mixture is subjected to a mechanical treatment to reduce the particle size of the particulate solid. Examples of suitable mechanical treatments include ball milling, bead milling, gravel milling or by more elaborate techniques such as ultrasonication, microfluidizing (using a Microfluidics™ machine) or using hydrodynamic cavitation (using for example the CaviPro™ device).

The volume average particle size of the particulate dispersion after the mechanical treatment process is preferably from 50 to 300 nm, more preferably from 50 to 250 nm and especially from 50 to 200 nm. The volume averaged particle size may be measured by any suitable method. Preferred methods include laser scattering, photon correlation spectroscopy, disc centrifuge photosedimentometry and transmission electron microscopy.

If desired the dispersion may be filtered or centrifuged to remove any poorly dispersed or oversized particulate material prior to optional cross-linking. In particular, the process preferably comprises filtering a mixture comprising the dispersant, particulate solid and liquid medium (preferably prior to cross-linking if cross-linking is performed), preferably through a filter having a pore size of less than 10, more preferably less than 5 and especially less than 1 micron.

As previously described the dispersant may be cross-linked with a cross-linking agent in presence of the particulate solid and the liquid medium, thereby encapsulating the particulate solid within the cross-linked dispersant.

Low temperatures for cross-linking are preferred as this results in lower levels of flocculation and particle size growth of the particulate solid in the liquid medium. Preferably, the cross-linking reaction is performed at a temperature below 100° C., e.g. from 10° C. to 90° C. and more preferably from 30° C. to 70° C.

The pH for the cross-linking reaction, when performed, is preferably at least 6, e.g. from 7 to 14, more preferably from 7 to 12 and especially preferably from 8 to 11.

Before the cross-linking reaction starts any acid groups in the dispersant may be in the form of the salt and/or the free acid as hereinbefore described. However in order to better effect the reaction between acid groups and for example epoxy groups in the cross-linking agent at a temperature of below 100° C. it is preferred for at least some of the carboxylic acid groups to be present in the form of the salt. The salt form may be obtained by adjusting the pH (of all the components present in the process according to the first aspect of the present invention) to at least 6 prior to cross-linking.

The pH adjustment can be done by adding any suitable base. Preferred bases include metal hydroxides, oxides, carbonates as well as amines, substituted amines and alkanolamines, Especially preferred bases are the alkali metal hydroxides, ammonia, triethylamine and triethanolamine. An especially preferred alkali metal hydroxide is potassium hydroxide.

The time for the cross-linking reaction depends to some extent on the temperature and the pH. However, a preferred time is from 1 to 24 hours, more preferably from 1 to 8 hours.

Preferably the cross-linking is performed by a process comprising mixing the particulate solid, the dispersant, the cross-linking agent and the liquid medium.

The components may be mixed by any suitable method, e.g. shaking, stirring and so on.

Preferably the cross-linking is performed by a process comprising mixing a composition comprising the following components in the specified proportions:
a) 30 to 99.7 parts, preferably 50 to 97 parts of the liquid medium;
b) 0.1 to 50 parts, preferably 1 to 30 parts of the particulate solid;
c) 0.1 to 30 parts, preferably 1 to 30 parts of the dispersant;
d) 0.001 to 30 parts, preferably 0.01 to 10 parts of the cross-linking agent;
wherein the parts are by weight and the sum of the parts a)+b)+c)+d)=100.

Preferably the composition contains 0 to 4, more preferably 0 to 3 molar equivalents of borate compound per mole of epoxy groups (if any) in the cross-linking agent. For example, if the composition contains 1 mole of a diepoxide cross-linking agent, this would require 8 moles of borate compound to satisfy the requirement of 4 molar equivalents of borate compound per mole of epoxy groups in the cross-linking agent. When the composition does not contain an epoxy cross-linking agent then preferably it is free of borate compounds. The preferred borate compound is boric acid or a salt thereof.

If the cross-linking agent is present during mechanical treatment of the particulate solid this can result in undesirable pre-cross-linking of the dispersion before the particle size of the solid has been fully reduced. When the particulate solid is milled in the presence of the dispersant and the liquid medium the temperature is preferably not greater than 40° C. and especially not greater than 30° C.

The cross-linking agent is preferably added to a mixture comprising the particulate solid, dispersant and liquid medium after any mechanical treatment to reduce the particle size of the particulate solid. Cross-linking can occur whilst the cross-linking agent is being added but it is more preferred that at least the greater part of the cross-linking occurs after complete addition of the cross-linking agent. This facilitates more uniform dispersion of the cross-linking agent throughout the composition and results in more uniform cross-linking.

To inhibit cross-linking whilst the cross-linking agent is being added to a mixture comprising the particulate solid, dispersant and liquid medium, the cross-linking agent is preferably added to said mixture at a temperature below 40° C. and especially below 30° C.

The process preferably results in an encapsulated particulate solid having a volume average particle size of at most 50%, more preferably at most 25% greater than the volume average particle size of the particulate solid prior to addition of the cross-linking agent.

Preferably, the encapsulated particulate solid has a volume average particle size of from 50 to 300 nm, more preferably from 50 to 250 nm and especially from 50 to 200 nm. Conventionally, particulate solids having a volume average size of less than 300 nm are difficult to effectively stabilise.

Particulate solids of this size are particularly useful in inks, especially ink jet printing inks.

It is also possible to use optical microscopy either by visual qualitative assessment or by quantitative digital image capture and analysis to measure the extent of aggregation and/or flocculation during the process.

The random copolymer may be obtained from a supplier if so desired. In this case actually preparing the random copolymer used in the first aspect of the present invention is not required as a process step.

Alternatively, the random copolymer may be prepared by the copolymerisation performed as part of the process according to the first aspect of the present invention.

In one embodiment the dispersant is free from in-chain polyester groups. In another embodiment the dispersant is free from in-chain polyamide groups. In these embodiments the dispersant may comprise terminal ester or amide (for example as would be derived from the polymerisation of (meth)acrylate esters and amides). However in-chain ester and amide groups of the kind found in polyesters and polyamides are not present. In another embodiment the dispersant is free from in-chain polyether groups.

According to a second aspect of the present invention there is provided a dispersion obtainable or obtained by the process of the first aspect of the present invention.

Preferably, (as mentioned before) the dispersion is obtained or obtainable by a process according to the first aspect of the present invention which further comprises the step of cross-linking the dispersant with a cross-linking agent in the presence of the particulate solid and the liquid medium, thereby encapsulating the particulate solid within the cross-linked dispersant.

The dispersions may be used as inks 'as is' or, more usually, the dispersions will be mixed with one or more further ingredients in order to provide an ink having the desired properties. Preferably, any acidic groups in the dispersant are neutralised before the dispersion is converted into an ink.

The further ingredients include water, organic solvents (especially water-miscible organic solvents), surfactants (especially Surfynol™ surfactants), binders, preservatives, anti-cockle agents, anti-kogation agents, metal chelating agents, biocides and other ingredients used in ink formulations.

Suitable binders include natural and synthetic polymers. Preferred binders include poly(meth)acrylates, polystyrenics, polyesters, polyurethanes, alkyds, polysaccharides (e.g. cellulose) and proteins (e.g. casein). Preferably the binder is present in the composition at more than 100%, more preferably 200%, even more preferably 300% and most preferably more than 400% by weight based on the weight of the particulate solid and any dispersant.

A preferred ink composition comprises:
  a) from 0.1 to 50 parts, more preferably from 1 to 25 parts, especially 1 to 15 parts of a dispersion obtainable or obtained by a process according to the first aspect of the present invention; and
  b) from 50 to 99.9 parts, more preferably from 75 to 99 parts, especially 85 to 99 parts of a liquid vehicle comprising water and/or a water-miscible organic liquid;
  wherein all parts are by weight and components a) and b) add to 100 parts.

Preferably, the ink is suitable for use in an ink jet printer.

In the case of ink jet printing, the ink preferably has a viscosity of less than 30 mPa·s, more preferably less than 20 mPa·s and especially less than 10 mPa·s when measured at a temperature of 25° C.

In the case of ink jet printing it is preferred that the ink has a surface tension from 20 to 65 dynes/cm, more preferably from 25 to 50 dynes/cm when measured at a temperature of 25° C.

According to a third aspect of the present invention there is provided a process for printing an image on a substrate comprising applying an ink (as described above) to the substrate, preferably by means of an ink jet printer.

According to a fourth aspect of the present invention there is provided a substrate printed with an ink (as described above), preferably by means of an ink jet printer.

Preferred substrates are papers, e.g. plain or treated papers, which may have an acid, alkaline or neutral character, especially glossy substrates. Examples of commercially available papers are as described in International patent Application No. WO 2007/148035, page 13, line 24 to the end of line 37, which are incorporated herein by reference thereto.

According to a fifth aspect of the present invention there is provided an ink jet printer cartridge comprising a chamber and an ink (as described above) wherein said ink is present in the chamber.

The process of the present invention provides pigment dispersions which can be used in ink jet printing inks to provide prints having good durability and optical density, particularly on plain paper or on glossy paper.

According to a sixth aspect of the present invention there is provided the use of an ink as described above for printing onto plain paper. Preferably, the printing is for the technical purpose of achieving an improved reflectance optical density.

The invention is further illustrated by the following Examples in which all parts and percentages are by weight unless otherwise stated. Polymeric Dispersant synthesis

EXAMPLES 1 TO 6 AND COMPARATIVE EXAMPLE 1

Stage (a)—Preparation of Dispersants

Dispersants D1 to D5 and comparative dispersant CD1 were prepared from the components listed in Table 1 by the methods indicated below. In comparative dispersant CD1 there was no di- or higher-ethylenically unsaturated monomer. Neutralised dispersant solutions were prepared from each dispersant using the neutralisation agents indicated.

content of about 40% w/w. The number averaged molecular weight (Mn) and weight averaged molecular weight (Mw) were then measured by gel permeation chromatography using a DMF solvent and polystyrene standards. The resultant dispersant D1 (220.5 g) was neutralised by the addition of KOH solution and diluted with water to a solids content of 35% to give neutralised D1.

Dispersants D2 to D5 and neutralised D2 to D5 were prepared in a similar manner to D1 using the ingredients indicated in Table 1, except for the following changes:

In D2 the amounts of IPA and DPG were 270 g and 162 g respectively;

In D3 (a) there was used 345.1 g of IPA in place of the mixture of IPA and DPG; (b) the reactor contents were ulti-

TABLE 1

| | Ingredients | D1 | D2 | D3 | D4 | D5 | CD 1 |
|---|---|---|---|---|---|---|---|
| Monoethylenically unsaturated monomers | MAA | 20 | 20 | 15 | 15 | 12 | 15 |
| | 2-EHMA | 26.3 | 26.3 | 22.2 | 22.2 | 17.8 | 22.2 |
| | MMA | 29.9 | 29.9 | 26.2 | 26.2 | 21 | 26.2 |
| Di-and higher-ethylenically unsaturated monomers | DVB | 2.2 | 4.3 | 0 | 0 | 0 | 0 |
| | DUDMA | 7.8 | 15.6 | 0 | 0 | 0 | 0 |
| | EGDMA | 0 | 0 | 2.7 | 5.4 | 8.7 | 0 |
| Chain transfer agent | B-3MP | 5.4 | 10.8 | 2.2 | 4.5 | 7.1 | 0.5 |
| initiator | Vazo ™ 67 | 0 | 0 | 0.7 × 2 | 0.7 × 2 | 0.6 × 2 | 1.4 × 2 |
| | Triganox ™ 21S | 0.92 × 2 | 1.1 × 2 | 0 | 0 | 0 | 0 |
| Solvent (solids content w/w) | IPA | 0 | 0 | 17% | 17% | 17% | 17% |
| | IPA:DPG (3:2) | 20% | 20% | 0 | 0 | 0 | 0 |
| Mn | | 19,000 | 21,300 | 18,200 | 15,300 | 13,500 | 20,100 |
| Mw | | 43,000 | 42,600 | 38,400 | 30,300 | 27,500 | 35,000 |
| Neutralisation agent | | KOH | KOH | KOH (in DPG) | KOH (in DPG) | KOH (in DPG) | KOH (in DPG) |
| Final solids content (wt %) | | 35 | 35 | 35 | 35 | 35 | 35 |

In the above table MAA is methacrylic acid (a monoethylenically unsaturated hydrophilic monomer), 2-EHMA is 2-ethylhexyl methacrylate (a monoethylenically unsaturated hydrophobic monomer), MMA is methyl methacrylate (a monoethylenically unsaturated hydrophobic monomer), DVB is divinyl benzene, DUDMA is diurethane dimethacrylate, EGDMA is ethylene glycol dimethacrylate, B-3 MP is butyl-3-mercaptopropionate, Vazo™ 67 is 2,2'-Azobis(2-methylbutyronitrile), Triganox™ 21S is tert. butylperoxy-2-ethyl-hexanoate and DPG is dipropylene glycol. DMF is dimethylformamide. IPA is iso-propyl alcohol.

Solvent (solids content w/w) refers to the weight of solids in the copolymerisation composition, for Example 20% solids means the solids was present in an amount of 20 parts along with 80 parts of solvents. The word "solids" as used herein refers to the all the components which form the solid materials after polymerisation (i.e. monomers and chain transfer agents).

Dispersant D1 was prepared by dissolving the monoethylenically unsaturated monomers, di- and higher-ethylenically unsaturated monomers and chain transfer agents indicated in Table 1 in a mixture of IPA (231.3 g) and DPG (138.8 g) to give a 20% w/w solution which was charged into a reactor. The initiator was then added to the reactor and the contents were stirred continuously under a nitrogen gas atmosphere at 85° C. for 4 hours. The second charge of initiator was then added and the stirring under a nitrogen was continued at a 85° C. for a further 4 hours. The reactor contents were then cooled to a temperature of 25° C., poured into a rotary evaporator flask and evaporated to concentrate the mixture to a solids mately poured into a rotary evaporator flask and solvent evaporated to concentrate the resultant dispersant. The dispersant was then re-dissolved in a minimum amount of tetrahydrofuran and added into cooled, stirred hexane (20 volumes). The precipitated D3 was collected by filtration and dried in vacuo at 50° C. The Mn and Mw were measured by gel permeation chromatography using a DMF solvent and polystyrene standards; (c) D3 (10.0 g) was neutralised by the addition of DPG (12.0 g), water (29.3 g) and KOH solution (45% w/w, 2.5 g) followed by heating with stirring at 60° C. This resulted in neutralised D3;

D4 and D5 and neutralised versions thereof were prepared in a similar manner to D3 using the ingredients indicated in Table 1, except that 369.9 g and 335.6 g of IPA were used respectively.

Comparative dispersant CD1 and a neutralised version thereof were prepared in a similar manner to D1 using the ingredients indicated in Table 1, except that the amounts of IPA and DPG were 231.3 g and 138.8 g respectively.

Stage (b)—Preparation of Pigment Dispersions

Pigment dispersions PD1 to PD5 and comparative pigment dispersion CPD1 were prepared from neutralised dispersants D1 to D5 and CD1 using the following general method:

Carbon black pigment (Nipex™ 170IQ from Degussa) (15 parts), was mixed with neutralised dispersant solution (e.g. D1) (60 parts) and de-ionized water (25 parts). The mixture was then stirred for several minutes to form a pre-dispersion. The pre-dispersion was then placed into a Branson Digital S450D Ultrasonifier fitted with a 1.25 cm tapped horn with a flat tip. The sample was cooled using an ice-bath and dispersed at 60% amplitude for 60 mins. The resulting pigment dispersions had a MV average particle size of about 90 nm as measured by a Nanotrac™ instrument.

A cross-linked version of PD1 was prepared by mixing together PD1 (40 parts), an epoxy functional cross-linking agent Denacol™ EX321 (0.11 parts) and a 6.2% wt/wt solution of boric acid in water (0.8 parts). The mixture was stirred for 5 hours at a temperature of 65° C. before it was cooled to 25° C. This prepared a cross-linked pigment dispersion XLPD1.

Inks 1 to 6 and Comparative Ink 1

Inks 1 to 6 and Comparative Ink 1 were prepared by rolling a sealed bottle on rollers for a period of 30 minutes containing the following ingredients: deionised water (32.5 parts), pigment dispersion from stage (b) (40 parts) and an organic solvent mixture (27.5 parts) comprising 2-pyrrolidone (3 parts), glycerol (14.7 parts), 1,2-hexane diol (4.3 parts), ethylene glycol (5 parts) and Surfynol™ 465 (0.5 parts obtained from Air Products). Inks 1 to 6 and Comparative Ink 1 were applied to HP advanced IJ paper using the following method:

100 micro liters of the Ink were accurately pipetted onto the surface of the paper. The ink was then drawn down uniformly over the surface of the paper using a K-control K-bar (No 1, 6 microns wet film) to provide a stripe of ink on the paper. The ink was then allowed to dry on the paper for a period of 24 hours.

| Ink | Dispersion used | ROD | Improvement factor |
|---|---|---|---|
| Comparative Ink 1 | CPD1 | 1.21 | 0 (control) |
| Ink 1 | PD1 | 1.30 | 8 |
| Ink 2 | PD2 | 1.36 | 13 |
| Ink 3 | PD3 | 1.26 | 4 |
| Ink 4 | PD4 | 1.30 | 8 |
| Ink 5 | PD5 | 1.34 | 11 |
| Ink 6 | XLPD1 | 1.30 | 8 |

ROD means the reflectance optical density.
The improvement factor is calculated as follows:

$$100\% \times \frac{(ROD \text{ of the Ink under evaluation} - ROD \text{ of Comparative Ink 1})}{(ROD \text{ of Comparative Ink 1})}$$

Similar results were found on the following papers: Xerox 4200, 4CC art and Epson Crispia IJ paper.

Inks containing dispersions obtained by the process of the present invention demonstrated significant and desirable improvements in ROD on a range of paper substrates including plain (untreated) paper substrates. The cross-linked embodiment also demonstrated improved storage stability especially towards ink vehicles containing high proportions of organic solvents.

Further Inks

The further inks described in Tables I and II may be prepared wherein the Pigment Dispersions PD1 to PD5 are as defined above and the ink additives are as defined below. Numbers quoted in the second column onwards refer to the number of parts of the relevant ingredient and all parts are by weight. The inks may be applied to paper by thermal, piezo or Memjet ink jet printing.

The following abbreviations are used in Table I and II:

PG=propylene glycol
DEG=diethylene glycol
NMP=N-methylpyrrolidone
DMK=dimethylketone
IPA=isopropanol
MeOH=methanol
2P=2-pyrrolidone
MIBK=methylisobutyl ketone
P12=propane-1,2-diol
BDL=butane-2,3-diol
Surf=Surfynol™ 465 from Airproducts
PHO=$Na_2HPO_4$
TBT=tertiary butanol
TDG=thiodiglycol
GLY=Glycerol
nBDPG=mono-n-butyl ether of dipropylene glycol
nBDEG=mono-n-butyl ether of diethylene glycol
nBTEG=mono-n-butyl ether of triethylene glycol
PD=Pigment Dispersion

TABLE I

| PD | PD Amount | Water | PG | DEG | NMP | DMK | NaOH | Na Stearate | IPA | MEOH | 2P | MIBK | GLY | nBDPG |
|---|---|---|---|---|---|---|---|---|---|---|---|---|---|---|
| 1 | 30 | 50 | 5 | | 6 | 3 | | | | | 5 | | 1 | |
| 1 | 30 | 59.8 | | 5 | 5 | | 0.2 | | | | | | | |
| 2 | 40 | 45 | 3 | | 3 | 3 | | | 5 | 1 | | | | |
| 2 | 40 | 51 | | 8 | | | | | | | | 1 | | |
| 2 | 40 | 45.8 | 5 | | | | | 0.2 | 4 | | | 5 | | |
| 2 | 40 | 41 | | | 9 | | 0.5 | 0.5 | | | 9 | | | |
| 3 | 40 | 10 | 4 | 15 | 3 | 3 | | | 6 | 10 | 5 | 4 | | |
| 3 | 40 | 30 | | 20 | | | | | 9 | | | | | 1 |
| 3 | 50 | 25 | 5 | 4 | | 5 | | | | 6 | | 5 | | |
| 3 | 50 | 29.7 | 3 | 5 | 2 | 10 | | 0.3 | | 6 | | 5 | | |
| 4 | 50 | 15 | | 5 | 4 | 6 | | | 5 | 4 | 6 | 5 | | |
| 4 | 50 | 46 | | | | | | | | 4 | | | | |
| 4 | 40 | 50 | 5 | | | | | | 5 | | | | | |
| 4 | 40 | 40 | 2 | 6 | 2 | 5 | | | 1 | | | 4 | | |
| 5 | 40 | 40 | | 5 | | | | | | | 15 | | | |
| 5 | 40 | 44 | | | 11 | | | | | | 5 | | | |

TABLE I-continued

| PD | PD Amount | Water | PG | DEG | NMP | DMK | NaOH | Na Stearate | IPA | MEOH | 2P | MIBK | GLY | nBDPG |
|---|---|---|---|---|---|---|---|---|---|---|---|---|---|---|
| 5 | 50 | 30 | 2 | | | 10 | | | | | 2 | 6 | | |
| 5 | 50 | 39.7 | | | | 7 | 0.3 | | 3 | | | | | |
| 1 | 40 | 29 | 2 | 20 | 2 | 1 | | | | | | 3 | 3 | |
| 1 | 40 | 51 | | | 4 | | | | | 5 | | | | |
| 1 | 40 | 40 | | | | | | | | | | | 20 | |
| 1 | 40 | 40 | | | | | | | | | | | | 20 |

TABLE II

| PD | PD Amount | Water | PG | DEG | NMP | Surf | TBT | TDG | BDL | PHO | 2P | PI2 | nBDEG | nBTEG |
|---|---|---|---|---|---|---|---|---|---|---|---|---|---|---|
| 2 | 30 | 49.8 | 15 | | | 0.2 | | | | | 5 | | | |
| 2 | 30 | 58.8 | | 5 | | | | | | 1.2 | 5 | | | |
| 2 | 40 | 44.65 | 5 | 5 | | 0.1 | 4 | 0.2 | | | | | 1 | |
| 3 | 40 | 49.88 | | 6 | 4 | 5 | | | | 0.12 | | | | |
| 3 | 40 | 41.7 | 4 | 8 | | | | | | | 6 | | | |
| 3 | 40 | 44.8 | | 10 | | 0.3 | | | 5 | 0.2 | | | | |
| 4 | 50 | 39.7 | | 5 | 5 | | | 0.3 | | | | | | |
| 4 | 50 | 20 | | 10 | 4 | | | | 1 | | 4 | 11 | | |
| 4 | 40 | 35 | 4 | 10 | 3 | | | | 2 | | 6 | | | |
| 4 | 40 | 51 | | | 6 | | | | | | 3 | | | |
| 5 | 40 | 35.05 | | 9 | 7 | | 2 | | | 0.95 | 5 | | 1 | |
| 5 | 40 | 38 | 5 | 11 | | | | | | | 6 | | | |
| 5 | 50 | 36 | | | 7 | | | | | | 7 | | | |
| 5 | 50 | 24.5 | 5 | 5 | 4.1 | | 0.2 | 0.1 | 5 | 0.1 | 5 | | | |
| 1 | 40 | 50 | | 10 | | 1 | | | | | | | | |
| 1 | 40 | 50 | | | | | | 10 | | | | | | |
| 1 | 30 | 48 | | | 5 | | | 12 | | | 5 | | | |
| 2 | 30 | 40 | 2 | | 8 | | | 15 | | | 5 | | | |
| 2 | 40 | 40 | | | | | | 8 | | | 12 | | | |
| 2 | 40 | 40 | | 10 | | | | | | | | | 1 | |
| 2 | 40 | 40 | | | | | | | | | 10 | | 0 | 10 |

The invention claimed is:

1. A process for preparing a dispersion of a particulate solid comprising:
    dispersing a particulate solid with a dispersant and a liquid medium,
    wherein the dispersant is a random copolymer obtained or obtainable from the copolymerisation of a composition comprising:
        i) one or more monoethylenically unsaturated hydrophilic monomers,
        ii) one or more monoethylenically unsaturated hydrophobic monomers,
        iii) one or more di- and/or higher-ethylenically unsaturated monomers, and
        iv) one or more chain transfer agents;
    wherein the dispersion step is effected by a mechanical treatment which reduces the particle size of the particulate solid; and
    the process further comprises the step of cross-linking the dispersant with a cross-linking agent in the presence of the particulate solid and the liquid medium, thereby encapsulating the particulate solid within the cross-linked dispersant.

2. A process according to claim 1 wherein the composition contains no monomers having three or more ethylenically unsaturated groups.

3. A process according to claim 1 wherein the di-ethylenically unsaturated monomers comprise divinyl benzene and/or diurethane di(meth)acrylate.

4. A process according to claim 1 wherein the dispersant has an acid value of 50 to 200 mg KOH/g of dispersant.

5. A process according to claim 1 wherein the dispersant has a calculated Log P of from 1 to 4.

6. A process according to claim 1 wherein the dispersant has no hydrophilic non-ionic groups.

7. A process according to claim 1 wherein the liquid medium is an aqueous liquid medium.

8. A process according to claim 1 which further comprises the step of preparing the dispersant by copolymerisation of a composition comprising:
    i) one or more monoethylenically unsaturated hydrophilic monomers,
    ii) one or more monoethylenically unsaturated hydrophobic monomers,
    iii) one or more di- and/or higher-ethylenically unsaturated monomers, and
    iv) one or more chain transfer agents.

9. A process according to claim 1 wherein the particulate solid is carbon black or an organic pigment.

10. A process according to claim 1 wherein the monoethylenically unsaturated hydrophilic monomers comprise (meth)acrylic acid.

11. A process according to claim 1 wherein the monoethylenically unsaturated hydrophobic monomers comprise an ester of (meth)acrylic acid.

12. A process according to claim 1 wherein the composition comprises:
    a) 20 to 40 mol % of monoethylenically unsaturated hydrophilic monomer(s);

b) 50 to 70 mol % of monoethylenically unsaturated hydrophobic monomer(s),
c) 2 to 20 mol % of di- and/or higher ethylenically unsaturated monomer(s); wherein mol % is based on the total number of moles of all the monomers a) to c), the total mol % of monomers a) to c) is 100%; and
d) $0.9(n-1)$ to $3(n-1)$ moles of chain transfer agent(s) per mole of di- or higher-ethylenically unsaturated monomer(s), where n is the number of ethylenically unsaturated groups in the di- or higher-ethylenically unsaturated monomer(s); and
e) 0.5 to 3 wt % of free radical initiator(s) based on the sum of the weights of components a) to c).

* * * * *